United States Patent

[11] 3,584,240

| [72] | Inventor | Karl H. Hoffman<br>North Palm Beach, Fla. |
|---|---|---|
| [21] | Appl. No. | 812,658 |
| [22] | Filed | Apr. 2, 1969 |
| [45] | Patented | June 8, 1971 |
| [73] | Assignee | RCA Corporation |

[54] TRIGGER PULSE CIRCUITS
11 Claims, 2 Drawing Figs.

[52] U.S. Cl............................................... 307/271,
307/283, 307/293, 307/301, 328/63
[51] Int. Cl........................................................ H03k 3/64
[50] Field of Search........................................... 307/271,
283, 293, 301; 328/63, 67

[56] References Cited
UNITED STATES PATENTS
2,892,941  6/1959  Woestman et al. ............ 328/72X

| 3,088,409 | 5/1963 | Yavelberg ................. | 307/301X |
| 3,119,027 | 1/1964 | Fanst ......................... | 307/293X |
| 3,267,289 | 8/1966 | Washington et al. ......... | 307/301X |
| 3,320,435 | 5/1967 | Watters ...................... | 307/301X |

Primary Examiner—Donald D. Forrer
Assistant Examiner—R. C. Woodbridge
Attorney—H. Christoffersen

ABSTRACT: A charge storage means, such as a capacitor, and a switch, such as the emitter-to-base diode of a unijunction transistor connected across the capacitor. To prevent the capacitor from discharging prematurely, a valve, such as a second capacitor, is placed in series therewith in the charging circuit thereof. The values of the capacitors can be so chosen that once the first one discharges into the emitter-to-base diode circuit, it cannot again charge to the firing potential of this unijunction transistor until the second capacitor independently is discharged.

PATENTED JUN 8 1971 3,584,240

INVENTOR
Karl H. Hoffman

BY  H. Christoffersen
ATTORNEY

TRIGGER PULSE CIRCUITS

BACKGROUND OF THE INVENTION

Silicon controlled rectifier (SCR) type direct current power supplies powered from a three-phase alternating current source require a trigger circuit to close the SCR devices at the proper phase angle in the alternating current cycle to produce a constant output voltage level under various loading conditions. A reset signal from the power supply resets the trigger circuit at the same phase angle in each phase of the alternating current cycle. A feedback line from the power supply to the trigger circuit determines at what point in time relative to the reset signal the trigger circuit will generate a pulse and thus at what point in time the SCR will be made conductive.

Occasionally, under some loading conditions, the trigger circuit produces a second pulse before being reset, thus prematurely making the SCR device conductive in the phase succeeding the one that produced the reset pulse. A specific object of this invention is to provide a circuit for preventing unwanted trigger pulses in SCR power supplies. A more general object of this invention is to provide a broadly useful trigger circuit for producing only $n$ output pulses in response to a reset signal, where $n$ is some integer which may be equal to or more than 1.

SUMMARY OF THE INVENTION

A valve and charge storage means are connected in series to terminals of a charging means. A discharge means responsive to a charge of greater than a given magnitude is connected across said charge storage means for discharging the latter. The valve automatically opens in response to the passage through it of more than a given total charge. The valve parameters may be chosen to permit one or more discharges of the charge storage means. Another circuit may be employed again to close the valve to permit the charge storage means again to charge.

DETAILED DESCRIPTION OF THE INVENTION

Figure 1:
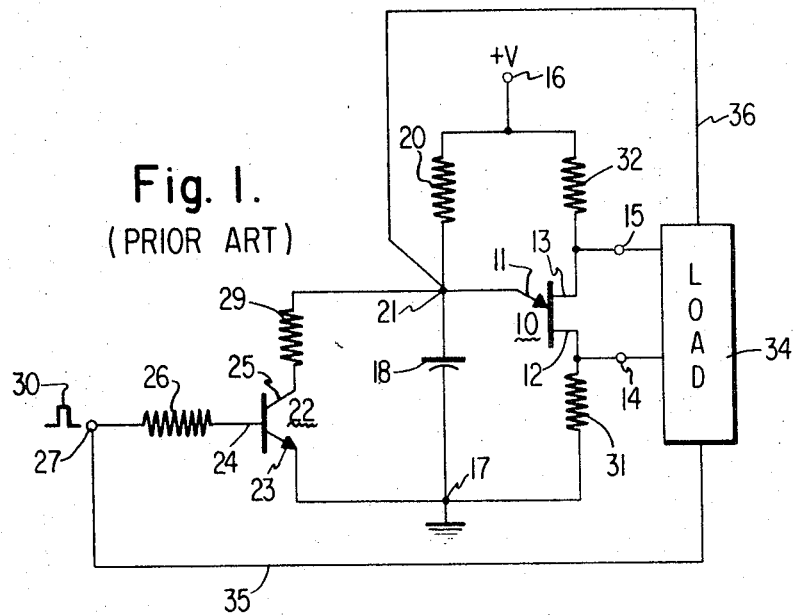
FIG. 1 is a circuit diagram illustrating the prior art.
Figure 2:
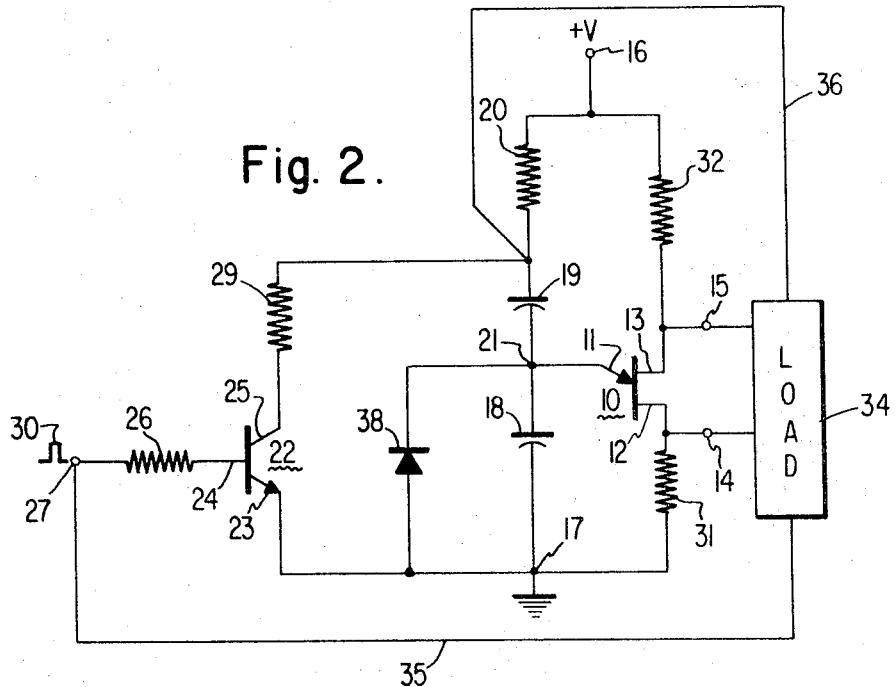
FIG. 2 is a circuit diagram of the preferred form of the invention.

A unijunction transistor such as shown at 10 in FIGS. 1 and 2 comprises a small bar of semiconductive material having two base electrodes and an emitter electrode. The base electrodes make ohmic contact at opposite ends of the bar; the emitter electrode forms a rectifying junction with the semiconductive material and is closer to one base electrode than to the other.

For purposes of the present discussion of the theory of operation of a unijunction transistor, assume a semiconductor body of the N-type and an PN emitter junction. Normally a direct current voltage is applied across the base electrodes such that the base more distant from the emitter is relatively negative with respect to the base nearer the emitter. With no emitter current flowing, the semiconductive bar acts as a voltage divider so that a fraction of the voltage drop across the bar appears at the emitter junction. If voltage is externally applied to the emitter which is less than that developed internally at the emitter junction, the unijunction transistor will be reversed biased and only a small emitter leakage current will flow. If the external voltage applied to the emitter is greater than that developed internally at the emitter junction, such external voltage, hereinafter called a triggering level, the unijunction transistor becomes forward biased and fires resulting in heavy current flow between the emitter and the more distant base electrode. The net effect of such current flow is a decrease in the resistance between the emitter and base thereby causing an increase in emitter current and decrease in emitter voltage, a negative resistance characteristic.

The prior art circuit of FIG. 1 includes a unijunction transistor 10 such as discussed above. The emitter electrode is shown at 11 and the two base electrodes at 12 and 13. The unijunction transistor illustrated has a semiconductive body of the N-type and a PN emitter junction, however, it is to be understood that the transistor could be of opposite conductivity. Base electrode 12 is coupled to positive output terminal 14 and base electrode 13 is coupled to negative output terminal 15. A power supply, not shown, normally a direct voltage source, is connected at its positive terminal to terminal 16 and at its negative terminal to a point of reference potential 17, such as ground. It biases the unijunction transistor base electrode 13 positive with respect to base electrode 12 providing a reference voltage at emitter electrode 11.

Charge storage means 18, represented in FIG. 1 as a capacitor, is connected across the emitter-base junction 11, 12 of unijunction transistor 10. Impedance 20, shown as a resistor, is interposed between terminal 16 and the common connection 21 of one terminal of capacitor 18 to the emitter electrode 11. A low impedance discharge circuit is connected across capacitor 18. It includes a transistor 22, the emitter electrode 23 of which is connected to ground and collector electrode 25 of which is coupled via resistor 29 to common circuit point 21. Input terminal 27, to which a positive-going reset pulse 30 may be applied, is coupled via resistor 26 to the base 24 of transistor 22. This pulse, in certain applications, may be derived from the load 34, at an appropriate point in each operating cycle. While the transistor 22 is shown of a NPN-type it is to be understood that a PNP-type transistor 22 may be used instead with minor circuit modification and appropriate polarity reset pulses.

In the operation of the circuit of FIG. 1, it may be assumed that capacitor 18 initially is fully discharged. With a voltage +V present at terminal 16, of say 24 volts, capacitor 18 begins to charge through resistor 20. Now assume that the voltage divider action of unijunction transistor 10 is such that emitter junction is at a potential of 12 volts. Capacitor 18 continues to charge until the triggering level, i.e. 12 volts, is reached at the emitter electrode 11 causing the unijunction transistor 10 to fire.

When unijunction transistor 10 fires, it becomes forward biased and the emitter-base junction 11, 12 changes from a relatively high impedance to a relatively low impedance, in effect shorting out a portion of the base-to-base resistance. This impedance reduction causes positive-going and negative-going signals to appear at terminals 14 and 15, respectively because current flows through resistors 31 and 32 in a sense to increase the voltage present at terminal 14 to some value such as +6 volts and to decrease the voltage present terminal 15 from about +23 volts to about +21 volts. Either or both of terminals 14 and 15 may be coupled to a load, shown here as a block 34, to provide a pulse to trigger some action, such as, for example, to trigger an SCR.

A low impedance at emitter-base junction 11, 12 appears across the terminals of capacitor 18 causing it to begin to discharge. Capacitor 18 will continue to discharge until almost all charge has been dissipated and the emitter electrode 11 drips to the extinction potential (a low voltage, such as 1 volt) of the unijunction transistor 10. This causes the unijunction transistor to become nonconductive and the emitter-base junction 11, 12 of the unijunction transistor 10 to return to its high impedance condition.

Capacitor 18 begins again to charge and the cycle repeats. Each time capacitor 18 charges sufficiently to fire unijunction transistor 10, positive- and negative-going signals appear at terminals 14 and 15, respectively.

In typical applications of this circuit, periodic resynchronization of the output pulse timing is necessary. Resynchronization is accomplished by applying a reset pulse 30 to transistor 22 via reset terminal 27. The reset pulse is such that transistor base electrode 24 is made relatively more positive than emitter electrode 23 such that the transistor is driven to saturation. The resulting low impedance between collector electrode 25 and emitter electrode 23 provides a discharge path for capacitor 18. The duration of the pulse 30 applied to terminal 27 must be sufficient to permit capacitor 18 fully or nearly fully to discharge.

Circuits of the type just described are often used to trigger SCR semiconductor devices in direct current power supplies. In this application, only one SCR triggering pulse is desirable at terminals 14 and 15 after each reset pulse appears at terminal 27. Additional pulses are unnecessary and may cause premature triggering of the SCR devices resulting in poor power supply regulation. This will happen if a second output pulse at terminal 14 and 15 occurs when a nonconducting SCR is armed, an event which occasionally occurs using the prior art trigger pulse circuit. If feedback line 36 were not connected to common connection 21, capacitor 18 would always fire at the same time relative to the time of reset pulse 30 and circuit parameters could be designed to prevent a second firing of unijunction transistor 10 between successive reset pulses 30. However, feedback line 36 acts as a variable shunt across capacitor 18 varying its charging time in proportion to the magnitude of direct voltage, and thus varying the firing time of unijunction transistor 10 relative to the time of reset pulse 30.

The circuit of FIG. 1 may be modified as shown in FIG. 2, which is a preferred embodiment of the invention to eliminate unwanted output pulses. Elements in FIG. 2 similar in structure and function to the corresponding elements of FIG. 1 are identified by the same reference numerals.

Valve 19, here shown as capacitor, is connected between the resistor 20 and the capacitor 18. Unidirectional device 38, here shown as a semiconductor diode is connected at its cathode to common circuit point 21 and at its anode to ground.

Once again for purpose of discussion, assume that capacitors 18 and 19 initially are fully discharged. With a voltage present at terminal 16, capacitor 18 and capacitor 19 begin to charge through resistor 20. As in the operation of FIG. 1, charging continues until the emitter-base diode 11, 12 of unijunction transistor 10 becomes conductive and thus changes from a relatively high impedance to a relatively low impedance path to discharge capacitor 18. Capacitor 18 then rapidly discharges until the emitter-base diode 11, 12 of unijunction transistor 10 becomes once again nonconductive and changes from a relatively low impedance to a relatively high impedance.

During the discharge of capacitor 18, capacitor 19 maintains the same level of charge it had attained when unijunction transistor 10 became conductive. When the emitter-base junction 11, 12 again becomes nonconductive it and capacitor 18 once again begin to charge through resistor 20. However, capacitor 18 starts charging from a fully or almost fully discharged state, while capacitor 19 starts charging from the charge state it attained when unijunction transistor 10 became conductive. If the ratio of the capacitance of capacitor 19 to that of capacitor 18 ($C_{19}/C_{18}$) is properly selected, capacitor 19 will become fully charged before capacitor 18 reaches the charge level necessary to fire unijunction transistor 10 a second time. The result is that only one pair of coincident pulses (positive-going at 14 and negative-going at 15) is generated. It is also possible, by proper selection of the ratio $C_{19}/C_{18}$ to produce more than one pair of pulses before capacitor 19 is fully charged preventing further charge from being applied to capacitor 18.

If it is desired to make unijunction transistor 10 conductive only one time, the ratio of capacitor 19 to capacitor 18 is chosen using the following approximate calculations. Assume a supply voltage of value $V$. Assume that unijunction transistor 10 is set to conduct at some fraction of the supply voltage which will be assigned the letter $N$. Thus, unijunction transistor 10 will conduct when voltage $NV$ is present at emitter electrode 11. Now in general $$V = 1/C \int i \cdot dt \quad (1)$$

and $$Q = \int i \cdot dt \quad (2)$$

equating gives $$V = Q/C \quad (3)$$

Further, let the voltage across capacitor 18 be $V_{C_{18}}$, the voltage across capacitor 19 be $V_{C_{19}}$, the value of capacitor 18 be $C_{18}$, the value of capacitor 19 be $C_{19}$, the charge on capacitor 18 be $Q_{C_{18}}$, and the charge on capacitor 19 be $Q_{C_{19}}$.

If the values of capacitor 18 and capacitor 19 are chosen so that unijunction transistor 10 is made conductive just as capacitor 19 becomes fully charged, the following equations will be true when unijunction transistor 10 becomes conductive:

$$V_{C_{18}} = NV \quad (4)$$

$$V_{C_{19}} = V - NV = V(1-N) \quad (5)$$

This equation is true since when capacitor 19 is fully charged the current flow through resistor 20 is zero. Also, at the time unijunction transistor 10 becomes conductive, the charge on each capacitor is the same since essentially all current flowing through capacitor 19 also flows through capacitor 18 until unijunction transistor 10 fires or $$Q_{C_{18}} = Q_{C_{19}} \quad (6)$$

Also, since in general $$Q = CV \quad (7)$$

$$Q_{C_{18}} = C_{18} \cdot V_{C_{18}} = C_{18} \cdot NV \quad (8)$$

$$Q_{C_{19}} = C_{19} \cdot V_{C_{19}} = C_{19} \cdot [V(1-N)] \quad (9)$$

substituting equations (8) and (9) in equation (6) gives $$C_{18} \cdot NV = C_{19} \cdot [V(1-N)] \quad (10)$$

Thus, the ratio of $C_{19}$ to $C_{18}$ to just make unijunction transistor 10 conductive as capacitor 19 becomes fully charged is $$\frac{C_{19}}{C_{18}} = \frac{N}{1-N} \quad (11)$$

This establishes the minimum ratio of the value of capacitor 19 to the value of capacitor 18. The maximum ratio is given by the point at which unijunction transistor 10 is made conductive the second time just as capacitor 19 becomes fully charged. Then equations (4), (5), (8), and (9) are true.

Since capacitor 19 has been charged twice without being discharged, the charge on capacitor 19 will be just twice that on capacitor 18 or $$Q_{C_{19}} = 2 \cdot Q_{C_{18}} = 2 \cdot C_{18} \cdot NV \quad (12)$$

Equating (9) and (12) gives $$2 \cdot C_{18} \cdot NV = C_{19} \cdot [V(1-N)] \quad (13)$$

which gives an upper ratio for $C_{19}/C_{18}$ $$\frac{C_{19}}{C_{18}} = \frac{2N}{1-N} \quad (14)$$

From the solution of $C_{19}/C_{18}$ to make unijunction transistor 10 conductive once just as capacitor 19 becomes fully charged and the solution of $C_{19}/C_{18}$ to make unijunction transistor 10 conductive a second time just as capacitor 19 becomes fully charged, $C_{19}/C_{18}$ must be chosen to satisfy the following inequality:

$$\frac{N}{(1-N)} < \frac{C_{19}}{C_{18}} < \frac{2N}{(1-N)} \quad (15)$$

A trigger circuit, with the ratio of capacitor 19 to capacitor 18 chosen to satisfy equation (15), will produce one and only one coincident pulse pair to terminals 14 and 15 after a rest pulse 30.

By proper choice of the ratio of $C_{19}/C_{18}$ the circuit can be made to produce $n$ pulses where $n$ is any positive integer. By analogy with the foregoing calculations it can be seen that for unijunction transistor 10 to produce $n$ pulses, the following inequality must exist:

$$\frac{nN}{(1-N)} < \frac{C_{19}}{C_{18}} < \frac{(n+1)N}{(1-N)} \qquad (16)$$

After unijunction transistor 10 is made conductive $n$ times, depending on the ratio of $C_{19}$ to $C_{18}$ as outlined in the preceding calculations it will not become conductive once again until capacitor 18 and capacitor 19 are discharged. This is accomplished by means of the discharge circuit comprising elements 22, 29, and 38. A positive-going reset pulse appearing at reset terminal 27 drives transistor 22 to saturation and causes a low impedance path to exist from collector electrode 25 to emitter electrode 23. This low impedance path allows capacitor 18 and capacitor 19 to begin to discharge.

As, after the generation of one or more pairs of pulses at 14, 15, capacitor 18 always has less charge than capacitor 19, it becomes fully discharged before capacitor 19. So long as any charge is present in capacitor 18, the voltage across it reverse biases diode 38 and the latter cannot conduct. However, when capacitor 18 becomes discharged, this reverse bias is removed and diode 38 becomes conductive. It now provides, along with the emitter-to-collector path of transistor 22, a low impedance discharge path for capacitor 19 and permits it fully to discharge. It is of course assumed in this discussion that the reset pulse applied at terminal 27 remains relatively positive for the time needed to discharge both capacitor 18 and capacitor 19.

In one operative embodiment of the circuit shown in FIG. 2, the components were as follows:

| | |
|---|---|
| Resistors 20, 26 | 10K ohms |
| Resistors 29, 31 | 30 ohms |
| Resistor 32 | 330 ohms |
| Capacitor 18 | 1.0μf. |
| Capacitor 19 | 1.22μf. |
| Transistor 10 | 2N1671A |
| Transistor 22 | 2N2270 |
| Diode 38 | 1N4001 |

What I claim is:

1. Pulse generating means comprising, in combination:
charge storage means;
means for charging said charge storage means;
means connected directly to said charge storage means responsive to a charge of greater than a given magnitude accumulated by said charge storage means for producing a pulse while discharging said charge storage means and responsive to the discharge of said charge storage means to a second lower value for allowing the charge storage means again to charge in repetitive fashion; and
means for limiting the production of pulses to a given number comprising valve means coupling said charge storage means to said means for charging the charge storage means for preventing the charge storage means from charging to said given magnitude in response to the passage through said valve means of more than a given amount of charge.

2. The combination set forth in claim 1, wherein said valve means comprises a second charge storage means.

3. The combination set forth in claim 1, wherein the means responsive to a charge comprises electronic switch means.

4. The combination set forth in claim 2, wherein said means responsive to a charge comprises the emitter-to-base diode of a unijunction transistor and wherein said charge storage means are connected directly to the emitter of said unijunction transistor.

5. The combination of claim 2 wherein said first and second charge storage means are respectively first and second capacitors of unequal value.

6. The combination of claim 2 wherein said first and second charge storage means are respectively first and second capacitors, said second capacitor having a greater capacity than said first capacitor.

7. The combination comprising:
two charge storage means connected essentially in series;
means coupled to the two charge storage means for charging one to a greater extent than the other;
a low impedance discharge circuit connected across the series circuit, whereby the charge storage means with the greater charge only partially discharges while the charge storage means with the lesser charge fully discharges; and
means connected across said storage means with the lesser charge which has a low impedance to the flow of charge in the discharge direction from said storage means with the greater charge and a relatively high impedance to the flow of charge in the opposite direction.

8. In a circuit including a charge storage means, means coupled to the charge storage means for charging the same and switch means coupled across said charge storage means responsive to a charge of greater than a given magnitude accumulated by said charge storage means for closing in response to said charge thereby discharging said charge storage means and responsive to the discharge to less than a given value of the charge present in said charge storage means for opening and thereby permitting said charge storage means again to charge in repetitive, the improvement comprising:
a second charge storage means coupled between the first charge storage means and its charging means and having a charge storage capacity such that after the first mentioned charge storage means has discharged more than $n$ times, it prevents said second charge storage means from accumulating sufficient additional charge to permit the charge on said first mentioned charge storage means to exceed said given magnitude, where $n$ is an integer which may be equal to 1.

9. The combination set forth in claim 8 wherein said second charge storage means is charged to a greater extent than said first mentioned charge storage means and further including a low impedance discharge circuit coupled across said second charge storage means responsive to a signal for discharging fully the first mentioned charge storage means while partially discharging the second charge storage means; and
means connected across said charge storage means with the lesser charge which has a low impedance to the flow of charge in the discharge direction from said storage means with the greater charge and a relatively high impedance to the flow of charge in the opposite direction.

10. In combination:
a unijunction transistor having two base electrodes and an emitter electrode;
a first capacitor coupled at its two terminals to said emitter electrode and one of said base electrodes, respectively;
terminals for a power supply connected across said two base electrodes in a sense to apply operating voltage to said unijunction transistor;
a second capacitor coupled between one terminal of said power supply and said first capacitor; and
a discharge circuit for said two capacitors including an electronic switch connected across both capacitors providing a low impedance discharge path when said switch is closed, and a diode connected across the second capacitor in a sense to conduct discharge current from the second capacitor in the forward direction.

11. In the combination set forth in claim 10, the ratio of the capacitance of said second capacitor to that of said first capacitor being such that after the unijunction transistor has been driven into conduction $n$ times, where $n$ is a positive integer, by a voltage accumulated on said first capacitor, said first capacitor cannot be charged to this same value again by said power supply until the said second capacitor has been discharged.